(12) United States Patent
Hendrick

(10) Patent No.: US 6,959,860 B2
(45) Date of Patent: *Nov. 1, 2005

(54) SYSTEM FOR AUTOMATIC CONNECTION TO A NETWORK

(76) Inventor: Colin Hendrick, 1411 President St., Brooklyn, NY (US) 11213

( * ) Notice: Subject to any disclaimer, the term of this patent is extended or adjusted under 35 U.S.C. 154(b) by 81 days.

This patent is subject to a terminal disclaimer.

(21) Appl. No.: 09/828,613

(22) Filed: Apr. 6, 2001

(65) Prior Publication Data

US 2001/0023892 A1 Sep. 27, 2001

Related U.S. Application Data

(63) Continuation of application No. 09/784,851, filed on Feb. 15, 2001, which is a continuation of application No. PCT/US00/04250, filed on Feb. 18, 2000.

(51) Int. Cl.$^7$ .................................................. G06K 5/00
(52) U.S. Cl. ..................... 235/380; 235/382.5; 709/227
(58) Field of Search ................................ 235/380, 382, 235/382.5, 487, 492; 705/35, 41, 42, 43, 44; 709/227, 217, 200–3

(56) References Cited

U.S. PATENT DOCUMENTS

| | | | | |
|---|---|---|---|---|
| 5,509,073 A | * | 4/1996 | Monnin | 380/20 |
| 5,577,109 A | * | 11/1996 | Stimson et al. | 379/112 |
| 5,887,065 A | * | 3/1999 | Audebert | 713/172 |
| 5,952,641 A | * | 9/1999 | Korshun | 235/382 |
| 5,995,965 A | * | 11/1999 | Experton | 707/10 |
| 6,075,846 A | * | 6/2000 | Jenneve et al. | 379/24 |
| 6,087,955 A | * | 7/2000 | Gray | 340/5.74 |
| 6,226,744 B1 | * | 5/2001 | Murphy et al. | 713/200 |
| 6,308,886 B1 | * | 10/2001 | Benson et al. | 235/375 |
| 6,343,361 B1 | * | 1/2002 | Nendell et al. | 713/171 |
| 6,374,356 B1 | * | 4/2002 | Daigneault et al. | 235/382 |
| 6,792,464 B2 | * | 9/2004 | Hendrick | 709/227 |

* cited by examiner

Primary Examiner—Daniel Stcyr
(74) Attorney, Agent, or Firm—Cooper & Dunham LLP

(57) ABSTRACT

A computer system (10) that allows a user to automatically access one of a plurality of Internet Service Providers which require information specific to the user and/or the ISP (12) to be accessed. A smart card (14) contains the information specific to the user and/or the ISP (12) to be accessed, and a smart card reader (18) reads the information contained on the smart card (14) when inserted into the recess 16 of the smart card reader (18). A computer (24) having a Central Processing Unit CPU (22) that is in communication with the smart card reader (18) and which is also adapted to be connected to the ISP (12) via telephone line (30). An application program (26) resides on the CPU (22) and is configured to automatically retrieve the information contained on the smart card (14) when it is inserted into the smart card reader (18) and to use that information to gain access to one of the plurality of ISPs via the network by using one of a default access number indicating a designated ISP (12) and a local access number from a database (28) containing a list of access numbers for the plurality of ISPs along with corresponding location information for each access number in the list. The computer system (10) may further comprise an online advertising server (82) for serving advertisement information to the user based on profile information of the information specific to the user contained on the smart card (14).

18 Claims, 7 Drawing Sheets

SYSTEM FOR AUTOMATIC CONNECTION TO A NETWORK

This application is a continuation of U.S. Ser. No. 09/784,851, filed 15 Feb. 2001, which is a continuation of PCT International Application No. PCT/US00/04250, filed 18 Feb. 2000, designating the United States of America, which claims priority of Australian Application No. AU 17394/99 (PP9281), filed 18 Feb. 1999, the contents of which are hereby incorporated by reference into the present application.

TECHNICAL FIELD

The present invention relates to a computer system that allows a user to automatically connect to a network service provider, and more particularly, to a system and method which allows a user to automatically connect to a network service provider by using a data card (i.e., a "smart card"). A smart card is a card that is approximately the size of a credit card and stores electronic data on a microchip for use in a variety of applications. The present invention also relates to an online advertisement system that accesses user profile information stored on a smart card to provide advertisements specifically tailored to the user's profile.

BACKGROUND ART

With the increasing use of information technology to access and exchange information over a network, in addition to the emergence of commercial transactions which have been taking place over open networks such as the internet, it has become necessary to store information (particularly about a user) in a secure manner. One method of securing information is by a smart card. A smart card is approximately the size of a conventional credit card; however, instead of having a magnetic strip which stores data on the card, smart cards usually have a microchip embedded within their structure. The microchip stores information in the form of electronic data which may be of use to the smart card user.

Essentially, smart cards can be categorized into two distinct types, namely "contact smart cards" and "contactless smart cards." Smart card readers are devices that read information contained in a smart card microchip. They are typically connected to a computer so that information in the smart card chip can be relayed to the computer.

"Contact" smart cards are typically inserted into a smart card reader. These cards have a microchip on one side of the card which makes contact with an electrical connector contained within the smart card reader. Data is exchanged between the chip on the smart card and the electrical connector of the smart card reader.

"Contactless" smart cards do not have an exposed chip on one side of the card, but have an antenna embedded within the card itself. The antenna transmits information to a coupler unit or "smart card reader" which is also fitted with an antenna. The antenna allows information to be exchanged without physical contact having to be made between the smart card chip and the smart card reader.

Typically when a smart card is inserted into a reader mechanism, the embedded chip transmits a message to the host machine on which the reader is attached. This message typically acknowledges card insertion into the reader mechanism.

Existing applications that utilize the smart card are launched by a human user after the smart card is inserted or before the smart card is inserted. In the general case of application launch before card insertion a prompt within a typical application requires users to insert and then acknowledge card insertion through a prompt. In the general case of application launch after card insertion a similar acknowledgment is also required.

Internet Service Providers (ISPs) or Internet Access Providers (IAPs) are companies that provide individuals and companies with access to the internet and to other related services, such as website building and hosting. A user of an internet service typically accesses the ISP from his or her computer via a telephone line so as to gain access to the internet. The ISP usually requires the user to enter particular information in relation to the user, such as a login name and password which is then checked against the ISP's database to verify that the user is registered with the ISP. Traditionally ISPs have been located within their own regional areas and therefore the user typically dials a local number to access the ISP.

Problems can occur when the user uses his or her computer to log on to the ISP (e.g., such as on a business trip using a laptop computer) and the number recorded in the computer for the ISP may be different (i.e., different area and/or country code). It is then necessary for the user to enter in the area code (or country number if he or she is overseas) for the ISP and pay for a long distance call. Alternatively, the same ISP may have a local number within the particular locale in which the user is located at a particular time. However, the user typically has to physically search for the local ISP number in the particular locale in which he or she is located. Furthermore, delays in the time it takes for a user to access the internet can result whenever the user is in a different geographic location or happens to use a different computer.

Moreover, there is a need for a simple way to provide advertisements to a user which are specifically directed to that user's tastes and characteristics.

DISCLOSURE OF INVENTION

The present invention is directed to overcoming the problems in the prior art regarding the inconvenience of the user having to physically search for the local ISP number in the particular locale in which he or she is located, or the increased cost in paying for a long distance call if this search is not performed, or the delays in time it takes for a user to access the internet when the user is in a different geographic location or happens to use a different computer.

The present invention is also directed to an online advertisement system that accesses user profile information stored on a smart card to provide advertisements specifically tailored to the user's profile.

According to one embodiment of the present invention, there is disclosed a computer system for allowing a user to automatically access one of a plurality of network service providers which require information specific to the user and/or the network service provider to be accessed, the computer system comprising:

a data card which contains the information specific to either the user and/or the network service provider to be accessed;

a data card reader adapted to access at least part of the information contained on the data card when the data card is in communication therewith;

a data processor in communication with the data card reader and adapted to be connected to a network;

an application program resident on the data processor, the application program being configured to automatically retrieve at least part of the information contained on the data card when the data card is in communication with said data card reader and to use the information to gain access to one of the plurality of network service providers via the network by using one of a default access number indicating a designated network service provider and a local access number from a database containing a list of access numbers for the plurality of network service providers along with corresponding location information for each access number in the list, wherein the application program is immediately triggered upon insertion of the data card into the data card reader.

The data card typically comprises a microprocessor for processing the information stored within the data card, a memory component which enables the information to be stored within the data card and a communications interface for transferring the information from the data card to the data card reader.

The communications interface may include an antenna embedded inside the data card so as to communicate the information between the data card and the data card reader. In such an embodiment, the data card reader also has an antenna embedded inside so as to receive/relay information from/to the data card.

Alternatively, the communications interface may include a contact connector and the data card reader may include electrical connectors so that information can be received/relayed from/to the data card when the contact and the electrical connectors are in physical contact. The communications interface of the data card may make contact with a communications interface located on the data card reader. In some embodiments of the invention, the data card is a smart card and the data card reader is a smart card reader. The data card may also contain a battery for storage of power received from the data card reader when it is connected thereto.

Preferably, the data card is inserted into a recess provided within the data card reader. Typically, when the data card is inside the data card reader, the electrical connectors on the data card reader detect that a data card is inserted in the data card reader and an activation code is generated by the microprocessor and is sent to the data processor. The activation code is then sent to the application program.

When the activation code is received by the data processor, the application program instructs the CPU to generate a code to establish a link with the network service provider by instructing a modem to dial a default number to access the network service provider via the network. Hence, by inserting the smart card into the smart card reader, a connection is automatically established with the network service provider. The default number may be the number of a network service provider local to the user. If the dial-up sequence is via a network such as a telephone line, the phone number of the network service provider may be part of the specific information contained on the data card.

If the user is located in another city or indeed in another country, there will be a different country and area code required and the number dialed by the application program will not connect to the network service provider. In such a situation, the application program will also include a logic code which determines that a connection has not been made and shall generate a message to the user requesting that they input the country and/or the city in which they are currently located.

Optionally, the application program may contain a database detailing a list of the countries, the associated locale by area codes within those countries and may also include a list of network service providers within each country and local area location. In some embodiments of the invention, the message generated by the application program may generate from the database, the list of countries on a graphical display. Typically the user will then select the country he or she is located in at a particular time. Once the country is selected, the application may then generate from the database, a list of locales by area code associated with the selected country. The user then selects the locale in which he or she is located. The application program then notes the locale and retrieves from the database, the country code and/or the area code of the location.

Alternatively, the database may be stored on a memory means such as a compact disc read only memory (CD ROM) accessible by the data processor. Or, the database may be stored in a remote server accessible by the data processor.

In one embodiment, once the application program knows the locale of a user, the number of the nearest network service provider located in the locale is dialed by the data processor via the modem. In other embodiments, the user may have a designated network service provider and the application program then dials the number of the designated network service provider and the appropriate country and area code. Optionally, the application program may provide the user with a choice as to whether they wish to use their designated network service provider or a network service provider in their present locale. Furthermore, the application program may provide the user with a choice of network service providers from which to choose in a particular location.

Typically, the network service provider is an Internet Service Provider (ISP) or an Internet Access Provider (IAP) which provides internet services to the user. Alternatively, the network service provider might be a proxy server of an intranet.

The network which the user uses to access the ISP does not have to be a telephone line but can be any sort of telecommunications network such as a telecommunications cable or telephony.

In some examples of the invention, the specific information contained on the data card includes the user's login identification and password which is required to access the ISP. The specific information may, however, contain other pieces of information, such as verification codes or encrypted data relating to the user's finances or network preferences. This information can be used, for example, in the embodiment of the invention described in detail below wherein an online advertisement system accesses user profile information stored on a smart card to provide advertisements specifically tailored to the user's profile. This information may be inputted by the user upon initial use of the data card by having the user fill out a series of information fields. The personal information may then be encrypted and stored on the data card.

In some embodiments of the invention, the data processor is preferably a personal computer which includes or is connected to a modem which can access the internet. In other embodiments of the invention, the data processor may be housed within the data card reader, which may also include a graphical interface for the user to view information contained on the network.

According to another aspect of the present invention, there is disclosed a method for allowing a user to automatically access one of a plurality of network service providers which require information specific to the user and/or the network service provider to be accessed, comprising the steps of:

configuring an application program resident on a data processor to automatically retrieve at least part of the information specific to the user and/or the network service provider to be accessed contained on a data card when the data card is in communication with a data card reader and to use the information to gain access to one of the plurality of network service providers via a network by using one of a default access number indicating a designated network service provider and a local access number from a database containing a list of access numbers for the plurality of network service providers along with corresponding location information for each access number in the list; and immediately triggering the application program upon insertion of the data card into the data card reader.

In another embodiment of the present invention, an online advertisement system provides advertisements to a user that are specifically tailored to the user's profile. The online advertisement system comprises:

a data card for storing information specific to the user, including user profile information;

a data card reader for accessing the information contained on the data card when the data card is in communication therewith;

a data processor in communication with the data card reader; and an online advertising server connected to the data processor for serving the advertisements to the user, wherein the advertisements are specifically tailored to the user based on the user profile information.

In another embodiment of the present invention, a data card is provided for allowing a user to automatically access one of a plurality of network service providers, comprising:

a memory for storing information specific to the user and/or the plurality of network service providers and for storing an application program which is immediately triggered and which automatically uses the information to access one of the network service providers via a network when the data card is in communication with a data card reader that is communicating with a data processor.

In another embodiment of the present invention, a method is provided for automatically transferring information to a network, comprising the steps of storing the information on a data card, connecting to the network, and automatically uploading the information stored on the data card to the network upon connection thereto.

BEST MODE FOR CARRYING OUT THE INVENTION

It is to be understood that the invention disclosed and defined herein extends to all alternative combinations of two or more of the individual features mentioned or evident from the text or drawings. All of these different combinations constitute various alternative aspects of the invention.

The foregoing describes embodiments of the invention, and modifications obvious to those skilled in the art can be made thereto without departing from the scope of the present invention.

Figure 1:
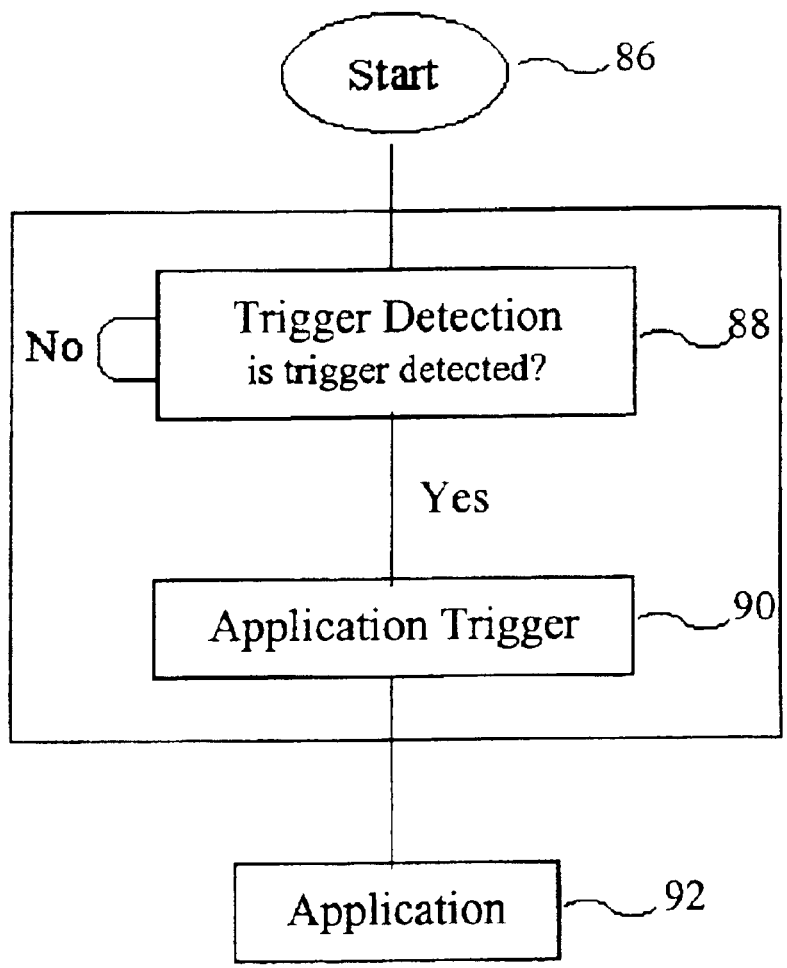
FIG. 1 shows the logic for the smart card application trigger process.

FIG. 1 shows the logic for the smart card application trigger process. This diagram describes how a host application is launched upon insertion of the smart card. There are many different possible host applications. For example, the application trigger process could be used to access data sources through a network, launch local and remote applications for a particular user, boot a computing device, restrict access to computing platforms, allow entry into building facilities, or start a combustion or non-fossil engine.

As shown in FIG. 1, upon system and/or detection software power-up, boot, or reset as denoted by Start 86, the system moves to the trigger detection step 88 to wait for insertion of the smart card. Upon insertion of the card, data representing card insertion is sent to the trigger detector to be detected by the trigger detection step 88. Once the trigger is detected (i.e., the smart card is inserted), the application trigger 90 causes the host application to be launched.

Figure 2:
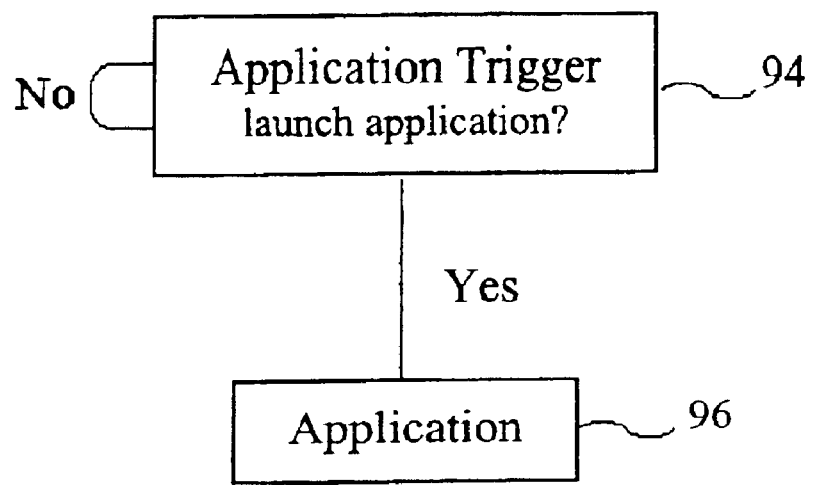
FIG. 2 shows a trigger process wherein the application trigger polls a variable.

FIG. 2 shows an alternative method for launching a host application upon insertion of the smart card. In FIG. 2, the trigger detection process is a continually running process that detects card insertion through smart card access attempts. The application trigger 94 polls an O/S boolean variable that is set to either true or false upon trigger detection. Upon detecting the appropriate true/false value of the variable denoting insertion of the smart card, the application trigger 94 launches the application 96.

The launched application can be stored on the smart card itself, and the trigger detector and application trigger can be integrated into the same module. For example, upon trigger detection an application may be launched on the card by the application trigger logic to perform authentication processes on the smart card. Authentication is the verification of user identity through a personal identification number (PIN) stored on the host machine. For example, the application launched by the application trigger process may ask for a PIN from the user. To avoid this step, the user could store his or her PIN on the host machine. The trigger detector would then read data from a file with the stored PIN before starting the application trigger to verify the PIN. Alternatively, the PIN reading application could be launched as normal without prompting the user for a PIN but instead reading the PIN number from a file.

This process is distinguishable from the process used by magnetic strip reading automated teller machines (ATMs) since there is no embedded-chip present in such devices. ATMs are mechanical devices that perform a reading operation when a mechanical latch or switch movement is detected upon card insertion.

Figure 3:
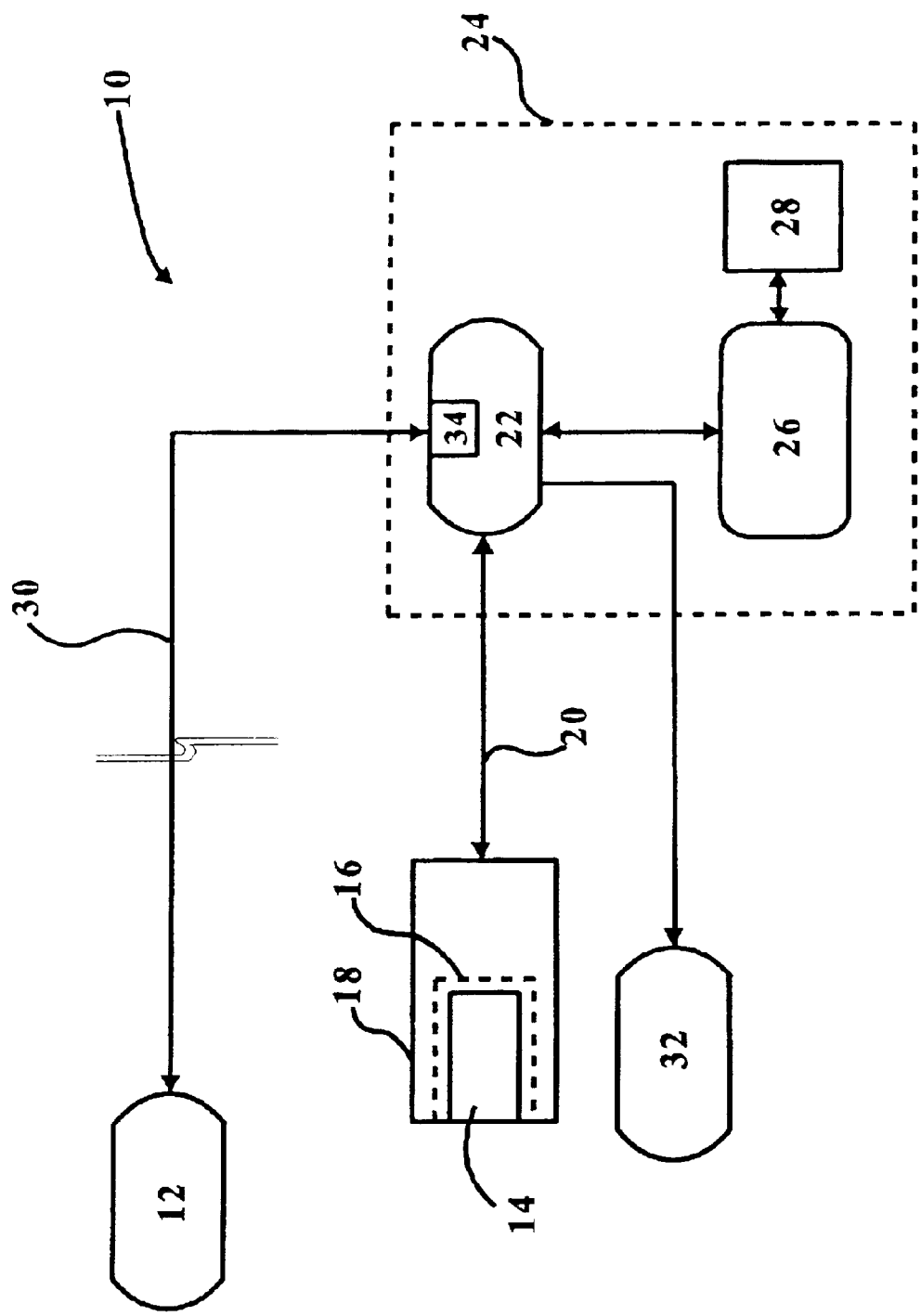
FIG. 3 shows an embodiment of the computer system in accordance with the present invention.

Next, the part of the system relating to automatic connection to a network according to the present invention will be described. Referring to FIG. 3, there is shown a computer system 10 which allows a user to automatically access a network service provider in the form of ISP 12. The ISP 12 requires the user's login identification and a password before the ISP 12 will provide access to the internet. This information is contained on a data card in the form of smart card 14 shown in FIG. 3 as being located within recess 16 that is within a data card reader in the form of smart card reader 18.

Upon first use of the smart card 14, the user may be required to input his or her personal information into the system using, for example, a series of information fields. This information is then encrypted and transferred onto the smart card 14.

The smart card reader 18 is adapted to read the login and password information for the ISP 12 that is contained on smart card 14. The smart card reader 18 is connected via cable 20 to a data processor in the form of central processing unit (CPU) 22 located within computer 24 (shown in this example of the invention by broken lines).

An application program 26 is resident in the memory of the computer 24, and contains code that allows the information contained on the smart card 14 to be processed by the CPU 22. The application program 26 is able to access information contained in a database 28, which stores information relating to the ISP 12 as well as a number of other ISPs which are located in different locales. The database 28 may be stored on a CD ROM or on a remote server, for example. The application program 26 may be configured to either dial a default access number previously stored on the smart card 14, or to read the area code from the smart card 14 and then dial a number from the database closely corresponding thereto. If there is no connection, a prompt asks the user to input the number to be dialed.

The computer 24 is also connected to a user graphical display in the form of monitor 32, which can display to the user information contained on the smart card 14 and information which is downloaded from the ISP 12. The computer 24 also contains a modem 34 which establishes a link with ISP 12 via a network in the form of telephone line 30.

Figure 4:
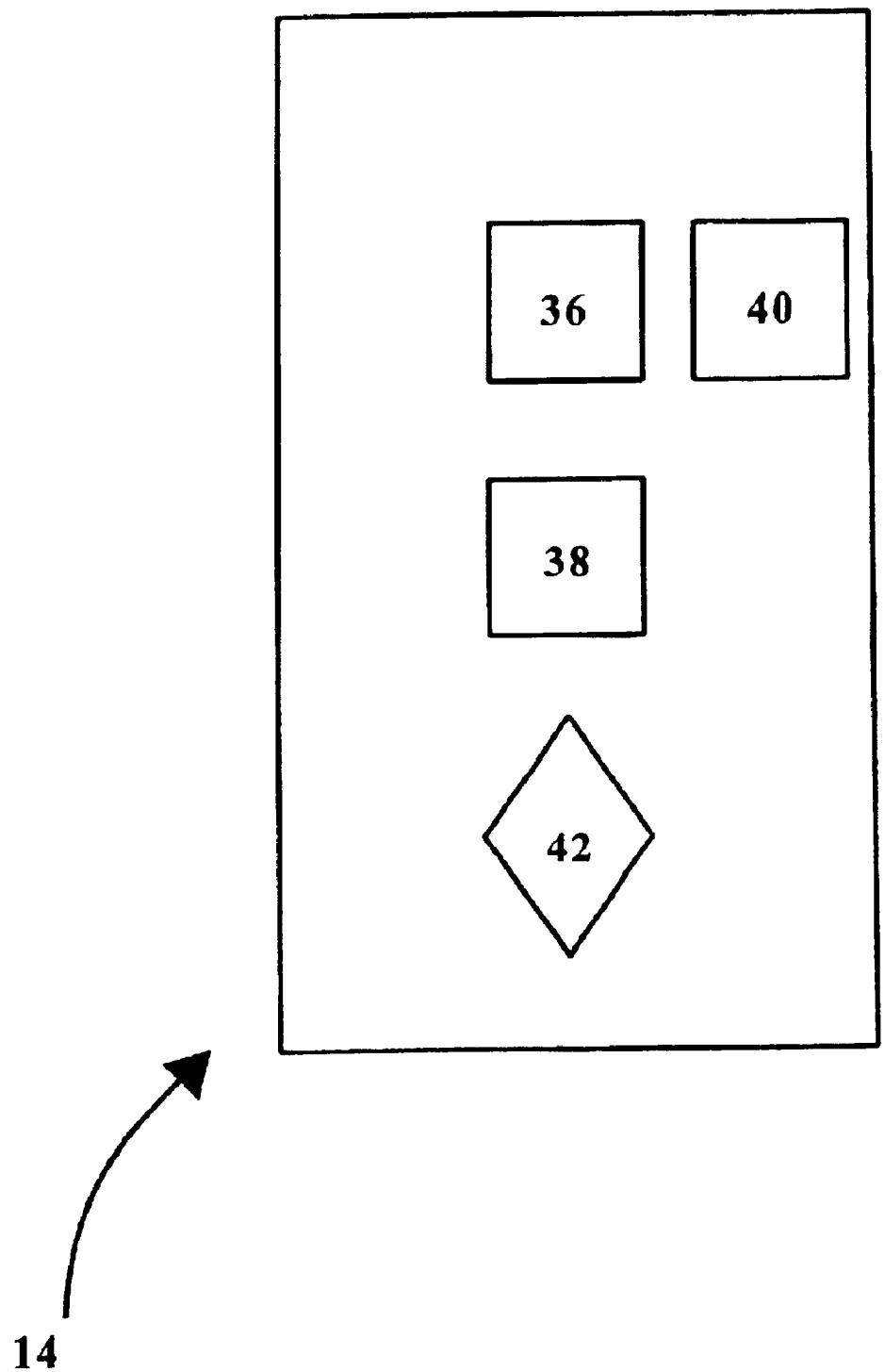
FIG. 4 shows an embodiment of the data card which is used in the data card reader of FIG. 3.

Referring now to FIG. 4, there is shown a cross-sectional view of the smart card 14. The smart card comprises a microprocessor 36 which can process information contained on the smart card 14, a memory component in the form of memory chip 38 which stores the information within the data card, a power source in the form of battery 40 which provides power to the microchip so that it can process information, and a communications interface in the form of contact connector 42. The contact connector 42 is exposed to the surface of one side of the smart card 14.

Figure 5:
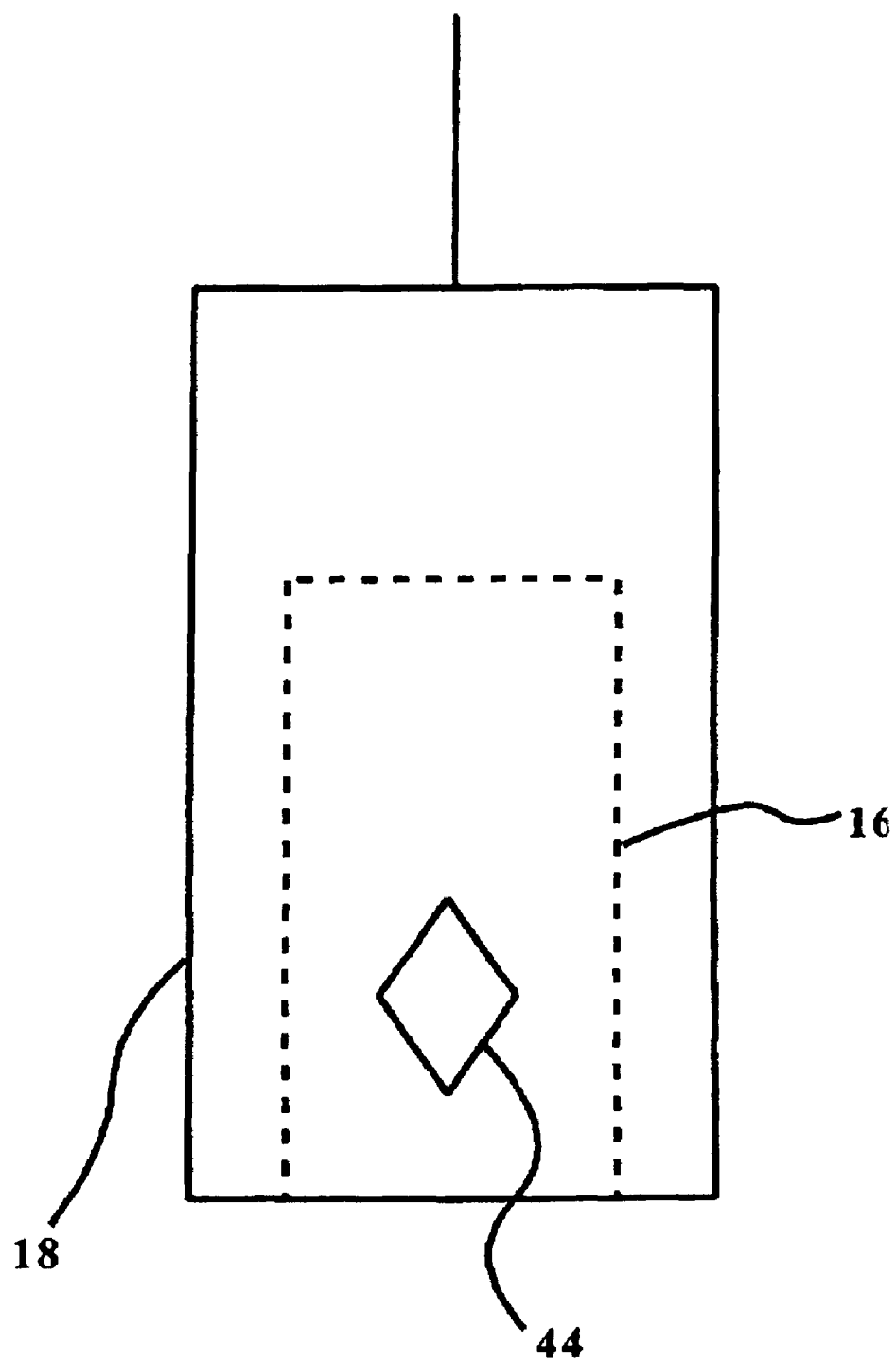
FIG. 5 shows in more detail the data card reader of FIG. 3.

Referring now to FIG. 5, there is shown the smart card reader 18 with the recess 16 shown by broken lines. On one side of the smart card reader 18 there is provided an electrical connector 44 which is adapted to make contact with the contact connector 42 whenever the smart card 14 is inserted into recess 16.

Figure 6:
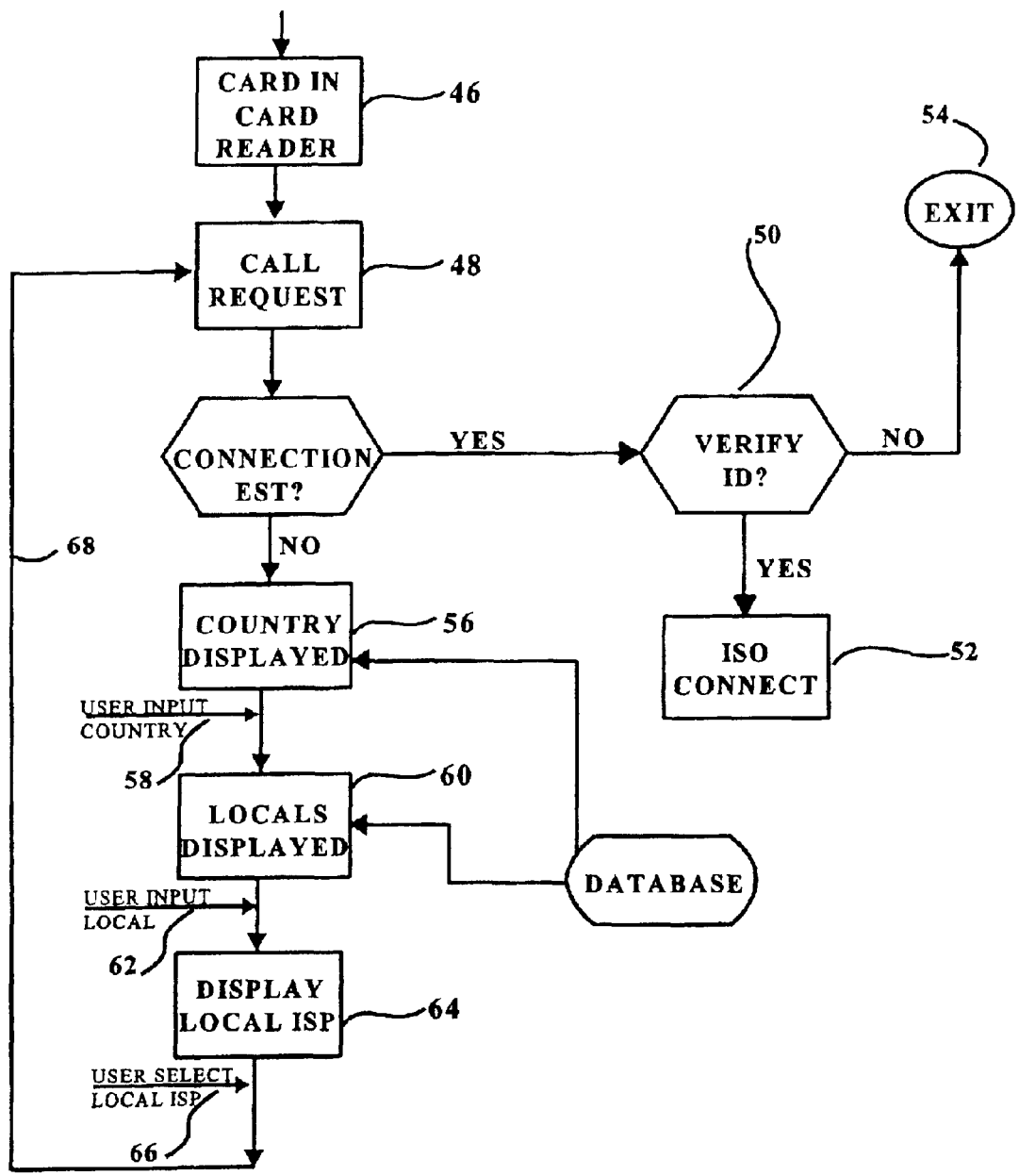
FIG. 6 shows a number of stages which the system uses to connect a user automatically to the internet, in accordance with the present invention.

Referring to FIG. 6, there is shown the steps for one typical method of the computer system according to the present invention, which will now be described in detail with reference also to FIGS. 3, 4, and 5. When a user wishes to connect to the ISP 12 in order to access internet services such as the World Wide Web or internet mail service, the user inserts smart card 14 into recess 16 of the smart card reader 18. The electrical connector 44 detects that the smart card 14 is within the smart card reader 18 when the contact connector 42 makes physical contact with electrical connector 44. In this example of the invention, an activation code is generated by the microprocessor 36, which is then sent to the CPU 22 via cable 20. The CPU then relays this initiation code to the application program 26. The first stage of this process can be seen as step 46 of FIG. 6.

Initially, the database is stored with the default telephone number of ISP 12 as a default so that the application program 26 automatically instructs the modem 34 to dial the telephone number of the ISP 12. The application program 26 then initiates a request code, requesting information relating to the login of the user for the ISP 12 from the smart card 14. The information from smart card 14 is then transferred from the memory chip 38 to the micro processor 36 out from the card via control connector 42 to electrical connector 44 and on to the CPU 22.

A routine call code is then generated to establish a link with ISP 12 as a call request as in step 48 of FIG. 6. The call request then activates modem 34 to place a call to ISP 12. If the telephone number of ISP 12 is correct, a connection is established with ISP 12 and the login information from smart card 14 can then be transmitted to the ISP 12.

The ISP 12 verifies that the login name and password are registered with the ISP in order to determine whether the call request is from an authorized user of the ISP 12. This can be seen at step 50 wherein the ISP 12 connection is made and the user is connected to the ISP 12 at step 52, or alternatively, if the identification is not verified as a registered user's login and password, the call request is terminated and the program exits (as can be seen at step 54).

In some circumstances, however, the user may be in another country and may not wish to use the ISP 12 but instead wishes to use another ISP which is not set as the default ISP in database 28. In such an instance, the local telephone number for ISP 12 would not work, as there is a different country code and area code, or, alternatively, a different ISP telephone number.

In the situation where the user is in another country and wishes to use an ISP in the locale of the particular location in which he or she is in, the default connection to ISP 12 will not be established and the user will be at step 56 of FIG. 6. That is, the application program 26 will determine that the connection has not been established with ISP 12 and will generate a list of countries from the database to the user on monitor 32.

The user then selects from the monitor 32 by using a mouse (not shown), the country in which they are in (e.g., the USA), as can be seen at step 58 of FIG. 6. The application program 26 then receives the selected country from the user and accesses the database 28 to retrieve all of the locales which are in the particular country. The locales are displayed to the user in the monitor 32 (as at step 60 of FIG. 6). The user then selects the locale in which he or she is in at the particular time (i.e. such as Washington, D.C.).

The ISPs located within that particular locale are then displayed and the user selects a particular ISP from this list (as can be seen at stage 66 of FIG. 6). Another call request is then initiated as outlined above (this time for the new ISP) as can be seen by the loop 68 of FIG. 6. It is assumed that in such a situation, each ISP in a particular locale would have the same verification details of the smart card 14.

In another example of the invention, the smart card may not be used to select a new ISP, but may call the local ISP 12 (e.g., in Sydney, Australia when the user is in Washington, D.C.) by going through steps 46, 48, and then 56. Instead of the user accessing an ISP in the particular locale he or she is currently located in (as described above), the user could select a "direct connect" option which would request the user enter his or her current country location (e.g., USA) and locale (i.e., Washington, D.C.). The application will then determine the international dial-up connection number, the country number, and the area code of the country in which the ISP 12 is located (in this example, Sydney, Australia).

The information contained within the memory chip 38 may contain not only the user's login identification to the ISP 12, but may contain additional types of data, such as data to carry out a business transaction or data to automatically fill in particular information required on a form.

One example of such information which could automatically be updated on a form is information required by a bank for a personal loan. The smart card 14 could store data relating to the user's income, home address, whether the user's residence is owned or rented, the credit rating of the user and a summary of the spending habits relating to the user. The user would connect to the ISP 12 and connect to a web page of a bank. As the user connects to the bank's ISP 12, the user's information is automatically sent or uploaded to the bank via its ISP 12. The user would not have to fill out any forms via a keyboard, but could input upon interaction with the bank's web page how much he or she wished to loan from the bank. Alternatively, the bank could automatically calculate from the user's information which has been automatically uploaded to the bank the maximum amount of money that it is willing to loan the user. Such information could be displayed to the user from the bank's web page.

A particular advantage of the smart card 14 is that as the user's credit rating or spending habits change, the amount the bank is willing to lend him or her will also change. Therefore, the user could quickly determine how much credit is available to him or her at any particular time, without having to fill out forms (either hardcopy forms or via a web page).

It should be further appreciated that the smart card 14 described herein does not have to be a contact smart card, but may in fact be a contactless smart card wherein the user accesses the ISP 12 whenever the smart card 14 (which in this example would have an antenna embedded within it) is passed near the smart card reader 18.

In yet another example of the invention, the smart card reader and computer 24 may not be separate devices, but may in fact be combined into one piece of hardware so that the user can automatically access the ISP 12. Alternatively, it may be that the CPU 22, modem 34, and application program 26 are located within the smart card itself.

It should also be appreciated that the specific information contained on the data card may also relate to information other than the user's login and password for the ISP 12. The smart card may contain data specifying the network preferences of the user, such as the user's personal web page "book marks" and the specific Uniform Resource Locator (URL) of a particular web site or personalized web page which is accessed whenever the user initially connects to the ISP 12. For example, the issuer of the smart card 14 may be a bank and the ISP 12 could be owned and managed by the bank. The user would be automatically connected to the bank's home page whenever smart card 14 is inserted into smart card reader 18.

Figure 7:
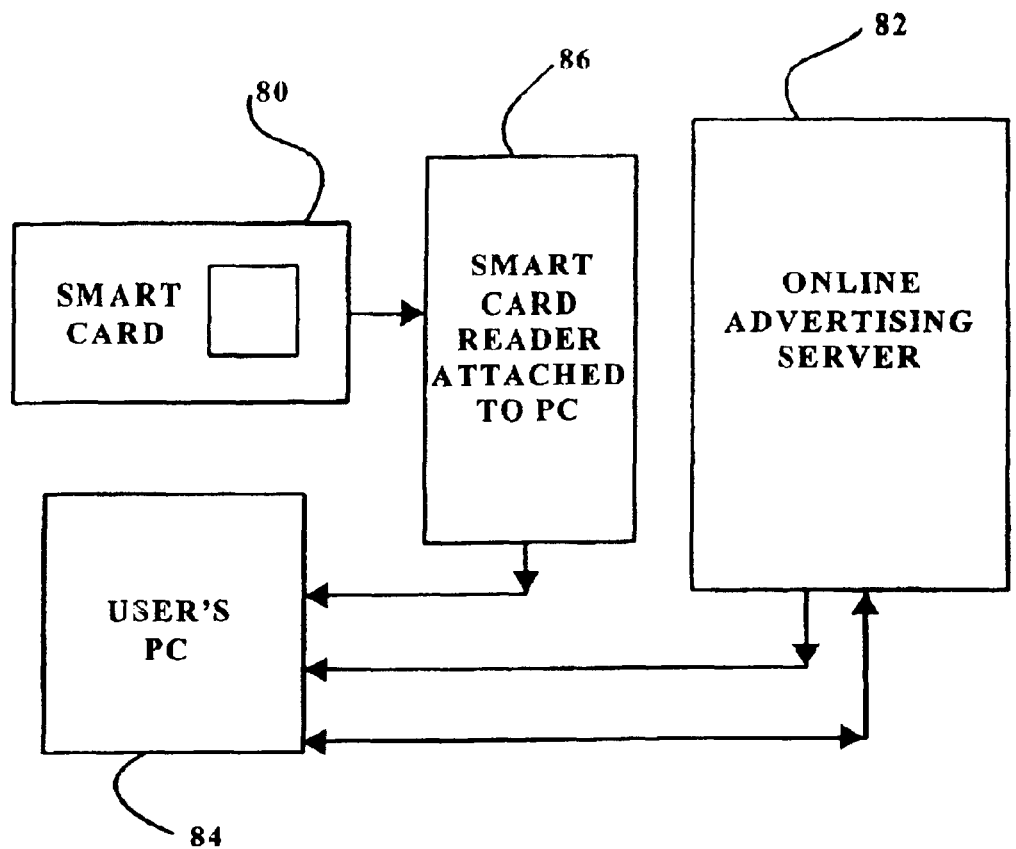
FIG. 7 shows a system including a remote server for serving specific advertisements to the user.

In another embodiment of the invention as shown in FIG. 7, the user is provided with online advertisement information that is specifically directed to the user's profile. The user's profile is determined from the personal identification information stored on the smart card 80. The identification information may include the user's name, address, sex, social security number, credit card number, age, and income. Against this individual user information is allocated a profile code sequence that identifies for each information field a profile identifier. For example, corresponding to the user's income will be a code for identifying a range of income that the user falls within. And, corresponding to the user's zip code will be an identifying code for identifying the region the user comes from.

A remote online advertising server 82 for serving up banner advertisements to the user's personal computer 84 will read the profile codes from the smart card 80 using the smart card reader 86 and will then serve to the user's computer advertisements that are targeted according to the user's profile. In this way, the user is provided with advertisement information that is specifically directed to the user's profile.

The above invention has been described with specific embodiments, but a person skilled in the art could introduce many variations on these embodiments without departing from the spirit of the disclosure or from the scope of the appended claims. The embodiments are presented for the purpose of illustration only and should not be read as limiting the invention or its application. Therefore, the claims should be interpreted commensurate with the spirit and scope of the invention.

What is claimed is:

1. A computer system for allowing a user to complete a secure transaction over a network, comprising:
   a data card which contains information specific to the user, including authentication information and personal information;
   a data card reader adapted to access at least part of the information contained on the data card when the data card is in communication therewith;
   a data processor in communication with the data card reader and adapted to be connected to the network; and
   an application program resident on the data processor, the application program being configured to automatically prompt the user to enter the authentication information for comparison with the authentication information stored on the data card, in order to authorize the user following a match thereof to complete the secure transaction over the network using the information specific to the user, wherein
   upon an initial use of the data card the user is prompted to initiate the data card by inputting the authentication information and the personal information into the data processor for storage on the data card.

2. The computer system as set forth in claim 1, wherein the user is prompted upon the initial use to input the authentication information and the personal information into a series of information fields.

3. The computer system as set forth in claim 1, wherein the personal information is encrypted before storage on said data card.

4. The computer system as set forth in claim 1, wherein the personal information includes at least one of user name information, user address information, user gender information, user age information, user government identification information, user credit card information, and user income information.

5. The computer system as set forth in claim 1, wherein a specific web site is triggered upon insertion of the data card into the data card reader.

6. The computer system as set forth in claim 1, wherein said data card comprises:
   a microprocessor for processing the information contained on the data card;
   a memory for enabling the information to be stored within the data card; and
   a communications interface for transferring the information from the data card to the data card reader.

7. The computer system as set forth in claim 1, wherein said data processor is housed within said data card reader.

8. A method for allowing a user to complete a secure transaction over a computer network, comprising the steps of:

storing information specific to the user on a data card, including personal information and authentication information; and configuring an application program resident on a data processor to automatically prompt the user to enter the authentication information for comparison with the authentication information stored on the data card, in order to authorize the user following a match thereof to complete the secure transaction over the network using the information specific to the user, wherein upon an initial use of the data card the user is prompted to initiate the data card by inputting the authentication information and the personal information into the data processor for storage on the data card.

9. The method set forth in claim 8, further comprising the step of providing a series of information fields to the user for inputting the authentication information and the personal information.

10. The method set forth in claim 8, further comprising the step of encrypting the personal information before storage on said data card.

11. The method as set forth in claim 8, wherein the personal information includes at least one of user name information, user address information, user gender information, user age information, user government identification information, user credit card information, and user income information.

12. The method as set forth in claim 8, further comprising the step of triggering a specific web site upon insertion of the data card into the data card reader.

13. A method for virtual form completion over a computer network for completing a business transaction, comprising the steps of:

storing information specific to a user on a data card;

connecting to said network;

automatically uploading said information stored on said data card to a virtual form contained on said network upon connection thereto;

carrying out the business transaction based on the information uploaded to the virtual form; and updating the information contained on the data card to reflect the business transaction, wherein upon an initial use of the data card the user is prompted to initiate the data card by inputting the information into a data processor for storage on the data card.

14. The method as set forth in claim 13, further comprising the step of triggering a specific web site upon connecting to the network.

15. The method set forth in claim 13, further comprising the step of providing a series of information fields to the user for inputting the information upon the initial use.

16. The method set forth in claim 13, further comprising the step of encrypting the information before storage on said data card.

17. The method as set forth in claim 13, wherein the information includes at least one of user name information, user address information, user gender information, user age information, user government identification information, user credit card information, and user income information.

18. The method as set forth in claim 13, wherein the information includes authentication information, and further comprising the step of verifying the authentication information upon connection to the network by prompting the user to enter the authentication information for comparison with the authentication information stored on the data card before proceeding to the automatic uploading step.

* * * * *